United States Patent
MacKenzie et al.

[11] 3,738,296
[45] June 12, 1973

[54] PHOTOELECTRIC RELATIVE MOTION DETECTOR

[75] Inventors: Fred T. MacKenzie, Beverly; Robert V. Brophy, Gloucester; Ralph E. Karcher, Jr., Magnolia, all of Mass.

[73] Assignee: USM Corporation, Boston, Mass.

[22] Filed: Sept. 21, 1971

[21] Appl. No.: 182,466

[52] U.S. Cl. .............................. 112/219 R, 250/219
[51] Int. Cl. ............................................. D05b 69/36
[58] Field of Search .................. 112/219 R, 219 A, 112/218 R, 220; 250/219

[56] References Cited
UNITED STATES PATENTS 3,599,586   8/1971   Newman ......................... 112/218 R
3,082,968   3/1963   Reichelt ............................. 250/219
2,708,892   5/1955   Ayres ......................... 112/218 R X Primary Examiner—H. Hampton Hunter
Attorney—Richard B. Megley, Vincent A. White and William R. Evans et al.

[57] ABSTRACT

A Photoelectric Relative Motion Detector in which a light source and a photoelectric device are mounted on a plate adjacent one side of an object having portions varying in light reflectivity spaced along a path of relative motion between the detector and the object. The plate shields portions of the object along the path from ambient light and shields electrical leads connecting the device to external circuits from extraneous electrical signals.

2 Claims, 2 Drawing Figures

PATENTED JUN 12 1973          3,738,296

PHOTOELECTRIC RELATIVE MOTION DETECTOR

BACKGROUND OF THE INVENTION

The invention relates to a Photoelectric Motion Detector.

There are many industrial applications in which it is useful to detect relative movement between adjacent bodies. Frequently, one body is a structure such as a machine part on which a Relative Motion Detector may be conveniently mounted. The other body is then an optical object which may be a group of spaced articles or a single article.

Where the object is a group of spaced articles it is well-known to place a photoelectric device and light source on opposite sides of the articles to detect the intermittent passage of light between adjacent articles upon relative movement of the articles and detector. Optical focusing of the light source relative to the photoelectric device permits strong excitation of the photoelectric device to provide a strong electrical signal. The relatively strong electrical signal may be conveniently used without interference from ambient light adjacent the device or electrical noise picked up by the external circuits connected to the device.

Where the object is a single article, a photoelectric device and light source must be mounted on one side of the object. Variations in the reflectivity of light from the object may then be used to excite the detector upon relative movement of the object and detector. Where the ambient light adjacent the detector is strong, it is difficult to photoelectrically observe variations in reflectivity and only small signal variations are thus produced by the device. This problem is frequently encountered where the relative movement occurs in an operating portion of a machine where substantial light must be provided to permit an operator to run the machine. Similarly, where the variations in reflectivity along a path of relative movement between the object and the detector are small, only weak signal variations are produced by the device. Such signal variations may be too weak to permit the use of a photoelectric signal detector.

Weak signals from a photoelectric device are particularly difficult to use where the electrical noise level picked up by means connecting the device to external circuits is high. Industrial machinery frequently generates a high level of electrical noise. High frequency devices, electrical relays, moving magnetic devices, and electric motors are all commonly used in industrial machines and all produce high levels of wave transmitted electrical noise which may be picked up by electrical connecting means.

To overcome the problem of electrical noise, it is well-known to connect a photoelectric device to external circuits by shielded leads. However, where relative motion is involved or machine tolerances are small, loose shielded leads are too bulky and inflexible to be conveniently used as they may interfere with the operation of the machine.

SUMMARY OF THE INVENTION

Accordingly it is an object of the invention to provide a Photoelectric Relative Motion Detector capable of detecting small variations in light and transmitting a corresponding weak electrical signal to external electrical circuits along leads immune to electrical noise and interference with a mechanical operation adjacent the device.

To this end the invention provides a Photoelectric Relative Motion Detector in which a light source and a photoelectric device are mounted adjacent one another on one side of an object. Light from the light source is reflected from the object toward the device so that variations in the light reflectivity of the object along a path of relative movement between the detector and the object vary the light reflected to the device. The device is mounted on a plate which is near enough to the object to shield portions of the object along the path from ambient light. The plate also has an internal, electrically shielded passageway for electrical leads connecting the device to external electrical circuits.

DESCRIPTION OF THE DRAWINGS

The invention will now be more particularly described in relation to illustrative preferred embodiment shown in the drawings, in which.

DESCRIPTION OF THE PREFERRED EMBODIMENT

Figure 1:
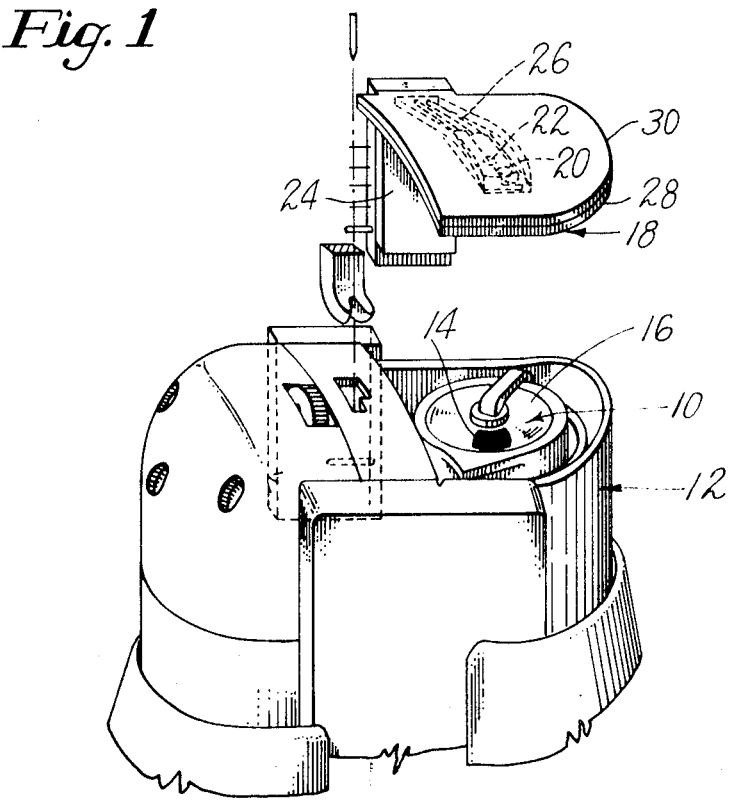
FIG. 1 is a partially exploded perspective view of a portion of a sewing machine in which a detector embodying the invention is mounted.

In the preferred embodiment, the invention is used to detect movement of a bobbin in a sewing machine relative to a portion of the machine frame. The sewing machine may be a standard design single needle sewing machine having a raised hook post of the type shown in U.S. Pat. No. 3,080,836 issued Mar. 12, 1963 in the name of J. E. Clemens et al. The patent describes a series of automatic controls for the illustrated sewing machine. No means are there provided for determining when thread wound on a bobbin mounted in the hook post of the machine has run out. The absence of bobbin thread leads to blank stitches and an imperfectly sewn article. Accordingly, the present invention is used in the following illustrative preferred embodiment to determine when bobbin thread has run out.

To this end, a bobbin 10, rotatably mounted inside a hook post 12, of a sewing machine is provided with a spot 14 on a sector of an upper surface 16 of the bobbin. The spot 14 has a light reflectivity differing from that of the remaining upper surface 16 of the bobbin. A laminated plate 18, is adapted to be mounted on the hook post over the bobbin. A light source 20 and a photoelectric device 22 are mounted adjacent each other on the plate so that light from the source is reflected from the upper surface 16 of the bobbin to the photoelectric device along a path of relative motion between the bobbin surface and the plate including the spot 14. Each complete rotation of the bobbin thus includes one variation in light reflected to the device resulting from the change in reflectivity when the spot 14 is illuminated by the light source. The variation in reflected light causes a variation in an electrical signal generated by the device 22 and transmitted to external electrical circuits 24 by electrical leads 26.

In the illustrative preferred embodiment, the external circuits comprise a counter (not shown) for counting variations in the signal transmitted from the device. The counter may be of any known type such as that described in U.S. Pat. No. 3,024,750 issued Mar. 13, 1962 in the name of K. Winz. Since the signal variations are in one-to-one correspondence with rotations of the bobbin, the counter counts bobbin rotations. When the number of bobbin rotations coincides with a preselected number, preferably the number of turns of thread wound on the bobbin, the counter is effective to activate means (not shown) for signalling an operator of the machine that the bobbin has run out. The signalling means may also be means for stopping the machine of the type described in the aforementioned patent.

Figure 2:
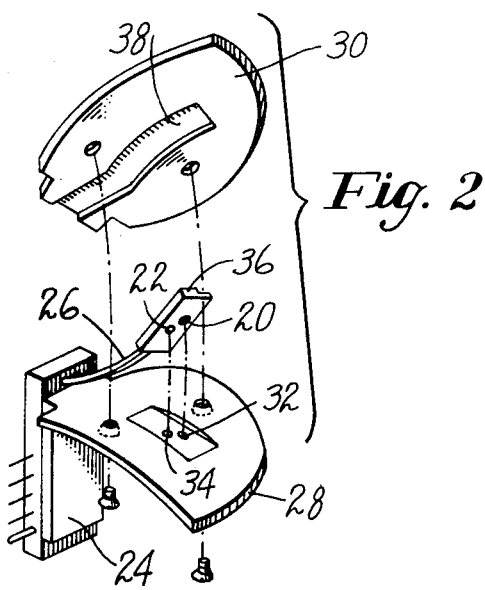
FIG. 2 is an exploded perspective view of the detector.

The plate 18 comprises plates 28 and 30 assembled in laminer form to constitute a unitary plate. As seen in FIG. 2, the structure 28 has a pair of holes 32 and 34 located over the path of relative movement between the bobbin and the plate which includes the spot 14 when the plate and bobbin are mounted on the hook post. The holes 32 and 34 align with the light source 20 and photoelectric device 22 mounted in a block 36 assembled between the laminated structures of the plate 18. The plate 30 has a channel extending to an edge of the plate for receiving the block 36 and the lead 26. The external circuits 24 connected to the lead 26 at the edge of the plate 30 having the channel 38. The lead 26 from the photoelectric to the external circuits is thus physically supported in the channel within the plate 18 from the device to the external circuits.

The plates 28 and 30 are made from an electrically conducting material which is opaque to light. The lead 26 is electrically insulated from contact with the plates and the electrically conducting nature of the plate shields the lead from wave transmitted electrical noise. A ground (not shown) connected to the plate may be provided if the plate is insufficiently sized to provide its own ground. The opaqueness of the plate shields the path of relative movement between the bobbin and the plate from ambient light which may be strong to permit an operator to clearly see an object being sewn on the machine.

In another embodiment of the invention the plate may be made from a single, non-laminated structure having the appropriate characteristics and an internal passageway for receiving the photoelectric device, light source and lead.

It should be understood that the foregoing describes only one, preferred embodiment of the invention and that substitute or equivalent elements or mechanisms other than those described can be used without departing from the scope of the invention defined by the following claims.

Having thus described our invention what we claim as new and desire to secure by Letters Patent of the United States is:

1. A detector for use on a sewing machine having a rotating bobbin wound with thread, the bobbin having a spot on a surface differing in light reflectivity from the remaining bobbin surface, wherein the detector comprises: a plate mounted adjacent the spotted surface of the bobbin to shield the bobbin surface from ambient light along a path of relative motion between the rotating bobbin and the plate; a photoelectric device and a light source mounted on the plate to reflect source light from the surface to the device along the path of motion; external circuits; and means within the plate electrically connecting the device to the external circuits for electrically shielding and physically supporting the connecting means within the plate.

2. A detector as in claim 1 wherein the external circuits comprise a counter and means responsive to the counter for stopping the machine when the counter coincides with a preselected number.

* * * * *